United States Patent [19]

Logsdon

[11] 4,081,051
[45] Mar. 28, 1978

[54] ADJUSTABLE SUPPORT FOR REVERSIBLE SEAT OF A DUAL-PURPOSE VEHICLE

[75] Inventor: John S. Logsdon, Chillicothe, Ill.

[73] Assignee: Caterpillar Tractor Co., Peoria, Ill.

[21] Appl. No.: 754,295

[22] Filed: Dec. 27, 1976

[51] Int. Cl.² ............................................ B60N 1/02
[52] U.S. Cl. ................................ 180/77 S; 296/65 R; 297/94
[58] Field of Search ............... 180/77 S; 296/65 R; 297/94–103, 327; 214/138 R

[56] References Cited

U.S. PATENT DOCUMENTS

| 1,140,097 | 5/1915 | Anger | 297/95 |
| 1,196,908 | 9/1916 | Walker | 297/95 |
| 3,150,897 | 9/1964 | Higley | 297/103 |
| 3,448,820 | 6/1969 | Aiello | 180/77 S |
| 3,479,082 | 11/1969 | Bilancia | 297/94 |
| 3,877,746 | 4/1975 | Christine | 297/95 |
| 3,883,172 | 5/1975 | Barton | 296/65 R |

FOREIGN PATENT DOCUMENTS

| 1,009,600 | 5/1952 | France | 297/95 |
| 866,502 | 12/1952 | Germany | 297/95 |
| K19,146 | 3/1953 | Germany | 297/95 |
| 1,634,713 | 6/1970 | Germany | 180/77 S |

*Primary Examiner*—Joseph F. Peters, Jr.
*Assistant Examiner*—Terrance L. Siemens
*Attorney, Agent, or Firm*—Wegner, Stellman, McCord, Wiles & Wood

[57] ABSTRACT

A seat for a dual-purpose vehicle having a first implement at the front and a backhoe at the rear is provided with a reversible back, and the seat is carried upon an adjustable support which includes a seat mounting carriage that has a forward end carried on rollers and a rearward end supported by links so that by the use of a manual lever which is pivoted adjacent the seat and operatively connected to the rear part of the carriage the seat may be elevated and moved rearwardly so as to provide a more favorable seat position for backhoe operation.

5 Claims, 4 Drawing Figures

ADJUSTABLE SUPPORT FOR REVERSIBLE SEAT OF A DUAL-PURPOSE VEHICLE

BACKGROUND OF THE INVENTION

As the cost of heavy equipment such as wheel loaders and track loaders increases, it becomes more and more desirable to provide such units which may also carry a rear-mounted implement such as a backhoe. In order for the operator to run the backhoe efficiently, he must be able to sit facing it, so such vehicles are provided with a reversible seat.

However, the location of the backhoe controls is such that the design of a seat apparatus for efficient backhoe operation also presents the problems of elevating the seat and moving it rearwardly. The design of such apparatus is complicated by the restricted space at the operator's station, which may have a cab, or rollover protection system, or neither; and by the desirability of using previously available components and sub-assemblies.

SUMMARY OF THE INVENTION

The present invention is directed to overcoming one or more of the problems as set forth above.

In accordance with the present invention, an operator's station of a vehicle which has a front mounted implement with controls at a first distance above the station platform and a rear mounted implement with controls higher above the platform is provided with a seat apparatus which is reversible and which may also be elevated and moved rearwardly by operation of a manual lever so as to improve the seat position for backhoe operation.

The above described result is obtained by providing a seat with a back mounted for movement between positions at opposite transverse margins of the seat, and mounting the seat upon a carriage the front of which is supported on rollers in a pair of parallel tracks and the rear of which is carried on a pair of supporting links. The manual lever is operatively connected to the carriage so that it can swing the rear of the carriage upwardly and rearwardly by pivoting it on the supporting links while at the same time the rollers at the front of the carriage move rearwardly in the tracks.

THE DRAWINGS

DETAILED DESCRIPTION OF THE INVENTION

Figure 1:
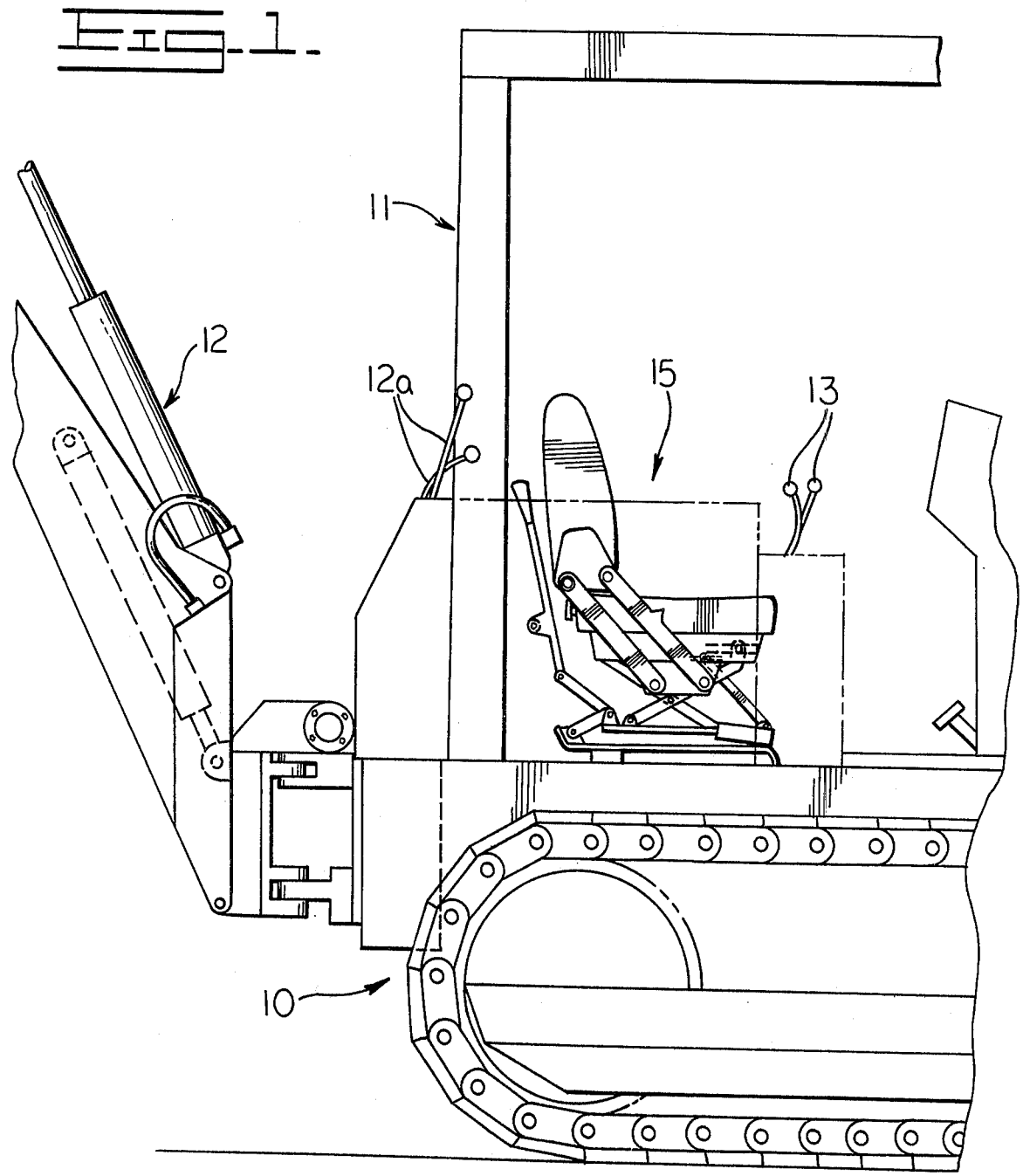
FIG. 1 is a fragmentary, somewhat schematic side elevational view of an operator's station of a track loader which has a cab and a rear mounted backhoe, with the seat structure of the invention in backhoe operating position.
Figure 2:
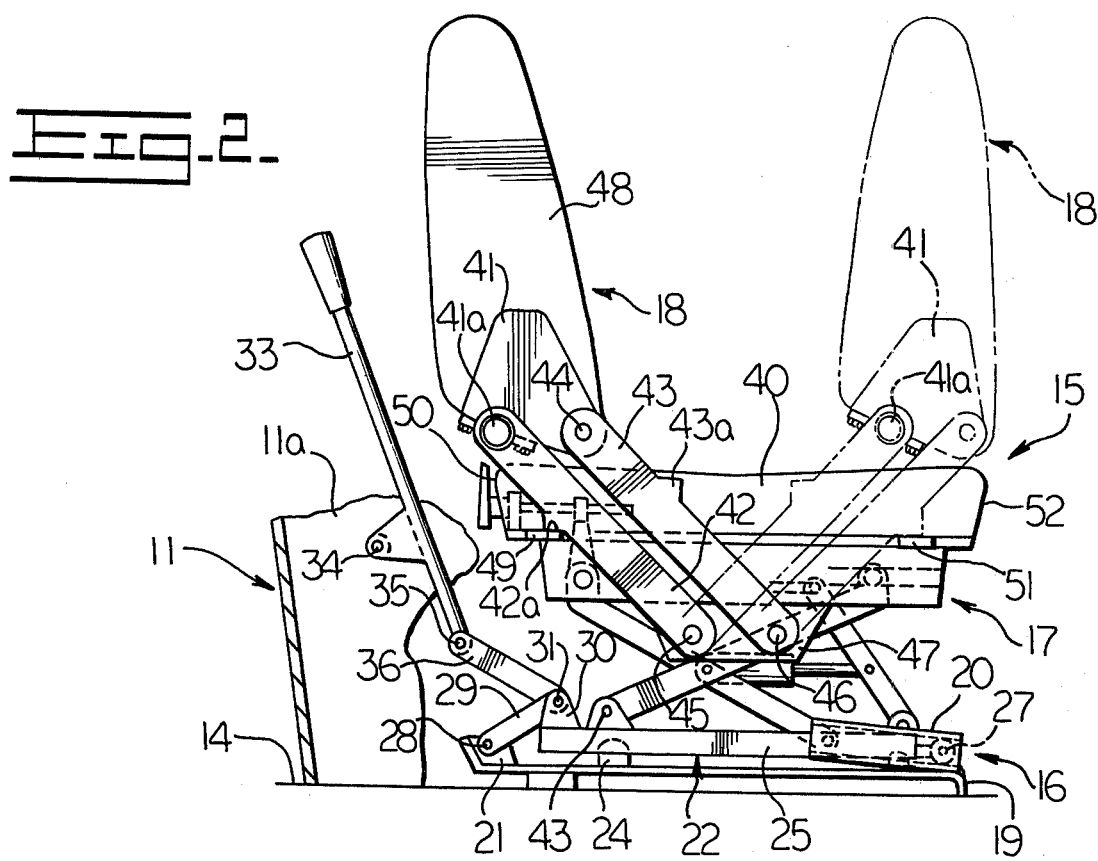
FIG. 2 is a side elevational view of the seat structure with its reversible back illustrated in solid lines in a front implement operating position and in broken lines in a backhoe operating position.
Figure 3:
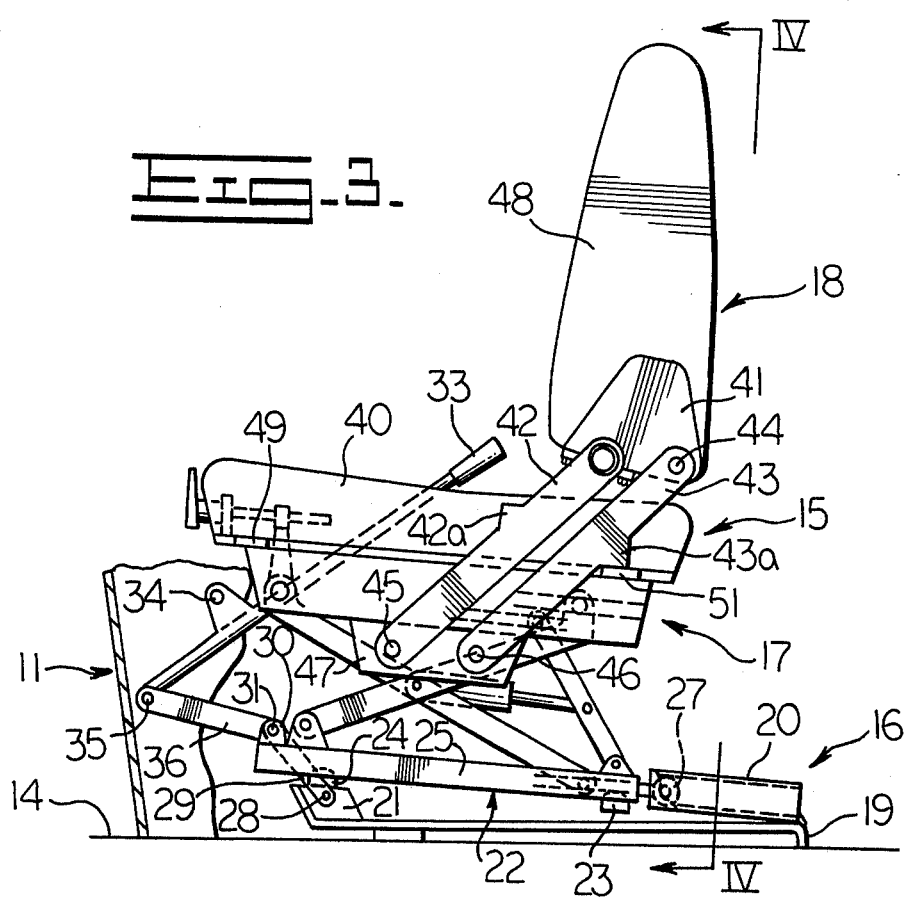
FIG. 3 is a side elevational view of the seat structure in its backhoe operating position.

A dual-purpose vehicle, indicated generally at 10, has an operator's station, which in the illustrated vehicle is a cab, indicated generally at 11, and at the rear of the vehicle is mounted a backhoe, indicated generally at 12, the controls 12a of which are mounted on the platform 14 of the vehicle to the rear of the cab 11. Not illustrated in the drawing is a first implement such as a loading bucket which is mounted on the front of the vehicle, and controls 13 for the loading bucket are mounted in the front of the cab at a level lower than that of the controls 12a. A reversible and adjustable seat apparatus, indicated generally at 15, which is the subject of the present invention, is mounted upon the platform 14 of the vehicle in the cab 11. As best seen in FIGS. 2 and 3, the seat apparatus 15 includes an adjustable support, indicated generally at 16; a seat structure, indicated generally at 17; and a reversible back structure, indicated generally at 18.

The adjustable support 16 consists of a pair of laterally spaced, elongated mounting brackets 19 which are mounted upon the platform 14, there being inclined channel tracks 20 on said brackets toward the front of the cab and pivot supports 21 on the brakcets toward the rear of the cab.

A carriage, indicated generally at 22, consists of a forward cross beam 23, a rearward cross beam 24, and longitudinal side beams 25 providing a rigid, rectangular structure. At the front of the carriage side beams 25 are laterally extending spindles 26, and journalled on the spindles are rollers 27 which support the front of the carriage 22 for longitudinal movement in the channel tracks 20.

Figure 4:
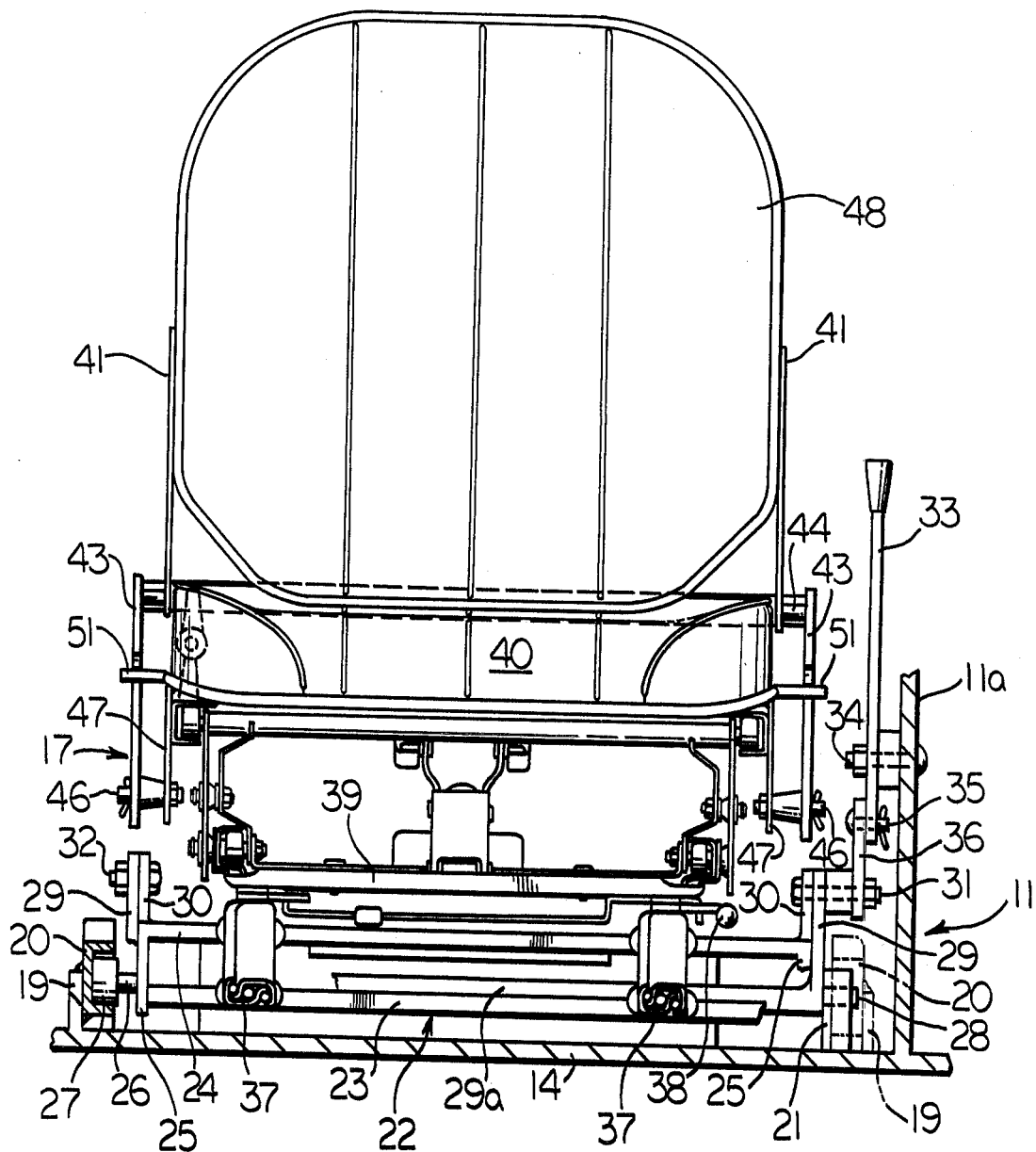
FIG. 4 is a sectional view on an enlarged scale taken substantially as indicated along the line IV—IV of FIG. 3 with parts broken away for clarity of illustration.

As seen in FIGS. 2 and 3, and at the right hand side of FIG. 4 where the carriage side beam 25 is broken away, the pivot supports 21 at the rear of elongated bracket 19 mount laterally extending pivot pins 28, and a supporting yoke consisting of links 29 at the ends of a cross-bar 29a is carried at one end upon the pivot pins 28 and at the opposite end is pivotally connected to integral flanges 30 on the rear carriage cross beam 24 by means of a right hand pivot bolt 31 and a left hand pivot bolt 32, as seen in FIG. 4. Thus, as seen by comparing FIGS. 2 and 3, the links 29 may support the rear of the carriage 22 in a lowered position with the rollers 27 at the front of the channel tracks 20, or in an elevated position with the rollers 27 at the rear of the channel tracks.

Movement of the carriage from the position of FIG. 2 to the position of FIG. 3 is carried out by means of a manual lever 33 which is mounted by means of a pivot 34 upon a side wall 11a of the cab which is at the right of FIG. 4. The wall 11a, of course, is the wall which is to the operator's right when he is facing rearwardly to operate the backhoe 12 by means of the backhoe controls 12a. At the lower end of the lever 33 is a pivot 35; and an actuating link 36 which has one end connected to the pivot 35 and the opposite end connected to the right hand pivot bolt 31 affords a lost motion connection between the manual lever 33 and the rear of the carriage 22. Moving the manual lever 33 from the position of FIG. 2 to the position of FIG. 3 operates through the link 36 to swing the carriage 22 rearwardly and upwardly about the supporting links 29 with the rollers 27 moving rearwardly along the channel tracks 20.

The seat structure 17 is described only generally herein because it is essentially the structure which is disclosed in U.S. Pat. No. 3,109,621, issued Nov. 5, 1963 to Bostrom Corporation on an application of Simons, Radke and Tengler. The principal difference is that the integral back structure of U.S. Pat. No. 3,109,621 is eliminated and the reversible back structure 18 of the present invention is substituted.

As best seen in FIG. 4, fixedly mounted upon the carriage 22 are commercially available three-bearing slides 37 upon which the seat structure 17 is mounted for fore-and-aft movement, and the three-bearing slides 37 include a conventional manual latch 38, so that the seat structure 17 may be adjusted fore and aft upon the three-bearing slides 37 and locked in any desired adjusted position. The three-bearing slides and the manual latch 38 are essentially the same as are used in the adjustable seats of passenger automobiles. The seat structure 17 includes a base plate 39 by means of which it is mounted upon the threebearing slides 37; and a padded seat 40 is mounted upon a supporting system like that of U.S. Pat. No. 3,109,621.

Referring now particularly to FIG. 2, that back structure 18 has a pair of side plates 41 which are connected by a torque tube 41a; and parallel links 42 and 43 are pivoted, respectively, on the axis of the torque tube 41 and upon a pivot 44. The opposite ends of the parallel links 42 and 43 mounted, respectively, upon pivots 45 and 46 in seat frame side plates 47. The back structure 18 includes a frame mounted between the side plates 41, and a padded back rest 48 is of the type either face of which may provide cushioned support for an occupant of the seat.

The back mounting links 42 have stop bosses 42a which rest upon laterally extending flanges 49 of the seat frame when the back rest 48 is adjacent a first transverse margin 50 of the seat 40 which is the rear margin, and the back mounting links 43 have stop bosses 43a which rest upon laterally extending flanges 51 when the back rest 48 is at the other, or front transverse margin 52 of the seat.

It is apparent from the foregoing description that the present mechanism achieves the desired objective of providing a seat for an operator's station, such as a cab of a dual-purpose vehicle, which has a reversible back, and which may be elevated and moved rearwardly by the operation of a manual lever so as to provide a more favorable seat position for backhoe operation.

It is further apparent that this is accomplished by providing a carriage which has an end toward the front of the cab supported on rollers riding in inclined tracks, and which has an end toward the rear of the cab supported upon pivoted links. Movement of the carriage is afforded by swinging a lever that is pivoted on the cab wall and has a lost motion connection with that part of the carriage which is toward the rear of the cab. The operation of the lever, acting through the lost motion connection in the form of a link moves the carriage toward the rear of the cab and at the same time elevates it.

Mounted upon the novel carriage is a commercially available track and ball bearing structure which provides for fore-and-aft seat adjustment upon the carriage; and mounted upon the commercially available track and ball bearing structure is a seat suspension which is also commercially available.

The seat itself is modified to provide a back rest which is reversible so that a vehicle operator may face in either direction. The mechanism for reversing the back rest is of a type which has been used for many years in reversible railway car and street railway car seats.

The entire apparatus is compact, so as to fit readily into the limited available space.

The foregoing detailed description is given for clearness of understanding only and no unnecessary limitations should be understood therefrom as modifications will be obvious to those skilled in the art.

The embodiments of the invention in which an exclusive property or privilege is claimed are defined as follows:

1. In a reversible and adjustable seat apparatus for an operator's station of a dual-purpose vehicle having a first implement at the front and a backhoe at the rear with backhoe controls which are higher above the vehicle platform than are the first implement controls, said seat apparatus including a seat and a back mounted for movement between positions at opposite transverse margins of the seat, an adjustable support on which said seat is carried comprising, in combination:
  a pair of laterally spaced, elongated mounting brackets on the vehicle platform;
  tracks on said mounting brackets toward the front of the operator's station;
  pivot supports on said mounting brackets toward the rear of the operator's station;
  a carriage on which the seat is mounted;
  rollers mounting the front of said carriage in said tracks;
  a pair of supporting links pivotally mounting the rear of said carriage on said pivot supports;
  and operating means including a lever operatively connected to the carriage for simultaneously elevating the rear of the carriage and moving the carriage rearwardly by pivoting it and said supporting links, whereby when the back of the seat is toward the front of the vehicle the seat position may be improved for backhoe operation.

2. The combination of claim 1 which includes a lost motion connection between an end of the lever and the carriage.

3. The combination of claim 2 in which the lever is pivotally mounted alongside the seat, and the lost motion connection comprises an actuating link connecting the lower end of said lever to the rear of the carriage.

4. The combination of claim 3 in which the actuating link and one of the supporting links are connected to a single pivot on the carriage.

5. The combination of claim 4 in which the vehicle has a cab provided with a sidewall and the lever is pivotally mounted on said sidewall.

* * * * *